United States Patent
Wang et al.

(10) Patent No.: US 11,989,516 B2
(45) Date of Patent: May 21, 2024

(54) METHOD AND APPARATUS FOR ACQUIRING PRE-TRAINED MODEL, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Lijie Wang, Beijing (CN); Shuai Zhang, Beijing (CN); Xinyan Xiao, Beijing (CN); Yue Chang, Beijing (CN); Tingting Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 342 days.

(21) Appl. No.: 17/572,068

(22) Filed: Jan. 10, 2022

(65) Prior Publication Data
US 2023/0004717 A1  Jan. 5, 2023

(30) Foreign Application Priority Data
Jun. 30, 2021 (CN) .......................... 202110734498.4

(51) Int. Cl.
*G06F 40/289* (2020.01)
*G06N 20/00* (2019.01)
(52) U.S. Cl.
CPC ........... *G06F 40/289* (2020.01); *G06N 20/00* (2019.01)
(58) Field of Classification Search
CPC ............................. G06F 40/289; G06N 20/00
See application file for complete search history.

(56) References Cited

U.S. PATENT DOCUMENTS

| 11,003,865 B1 * | 5/2021 | Lee ........................ G06N 3/045 |
| 2021/0034988 A1 | 2/2021 | Adel-Vu et al. |
| 2021/0103775 A1 | 4/2021 | Glass et al. |

FOREIGN PATENT DOCUMENTS

| CN | 108399158 A | 8/2018 |
| CN | 111488734 A | 8/2020 |
| CN | 111553142 A | 8/2020 |
| CN | 112016299 A | 12/2020 |

(Continued)

OTHER PUBLICATIONS

Zhang et at. Abstract of "A Study on Relation Extraction of Attention from Syntactic Dependency Trees." Guangdong Communication Technology, Vo. 10, Oct. 15, 2020, 1 Page.

(Continued)

*Primary Examiner* — Sonia L Gay
(74) *Attorney, Agent, or Firm* — Brooks Kushman P.C.

(57) ABSTRACT

The present disclosure provides a method and apparatus for acquiring a pre-trained model, an electronic device and a storage medium, and relates to the field of artificial intelligence, such as the natural language processing field, the deep learning field, or the like. The method may include: adding, in a process of training a pre-trained model using training sentences, a learning objective corresponding to syntactic information for a self-attention module in the pre-trained model; and training the pre-trained model according to the defined learning objective. The solution of the present disclosure may improve a performance of the pre-trained model, and reduce consumption of computing resources, or the like.

16 Claims, 3 Drawing Sheets

Add, in a process of training a pre-trained model using training sentences, a learning objective corresponding to syntactic information for a self-attention module in the pre-trained model — 101

Train the pre-trained model according to the learning objective — 102

(56) References Cited

FOREIGN PATENT DOCUMENTS

CN    112560496 A    3/2021
WO    2020107878 A1  6/2020

OTHER PUBLICATIONS

Peter Shaw, et. al. "Self-Attention with Relative Position Representations." Apr. 12, 2018, pp. 1-5, URL:https://arxiv.org/pdf/1803.02155v2.pdf, 6 Pages.

Hu Yanxia1, et. al. "Sentence Semantic Similarity Computation Based on Tree-LSTM With Multi-Head Attention" Journal Ofchineseinformation Processing, vol. 34, No. 3, Mar. 2020, 12 Pages.

Zenan Xu, et. al. "Syntax-Enhanced Pre-trained Model" School of Computer Science and Engineering, Sun Yat-sen University, Dec. 28, 2020, 11 Pages.

Yau-Shian Wang, et. al. "Tree Transformer: Integrating Tree Structures into Self-Attention" National Taiwan University, Taipei, Taiwan, Nov. 11, 2019, 15 Pages.

LJ Kurisinkel, et. al. Abstract of "Domain Adaptive Neural Sentence Compression by Tree Cutting" European Conference on IR Research, 1 Page.

* cited by examiner

METHOD AND APPARATUS FOR ACQUIRING PRE-TRAINED MODEL, ELECTRONIC DEVICE AND STORAGE MEDIUM

CROSS-REFERENCE TO RELATED APPLICATIONS

The present application claims the priority of Chinese Patent Application No. 202110734498.4, filed on Jun. 30, 2021, with the title of "METHOD AND APPARATUS FOR ACQUIRING PRE-TRAINED MODEL, ELECTRONIC DEVICE AND STORAGE MEDIUM." The disclosure of the above application is incorporated herein by reference in its entirety.

TECHNICAL FIELD

The present disclosure relates to the field of artificial intelligence technologies, and particularly to a method and apparatus for acquiring a pre-trained model, an electronic device and a storage medium in the fields of natural language processing technologies, deep learning technologies, or the like.

BACKGROUND

A pre-trained model trained based on large-scale unstructured text data brings a great effect improvement to a downstream task.

Currently, some studies attempt to make the pre-trained model learn syntactic information, so as to further improve an effect on the downstream task. For example, with a syntactic language model, a whole syntactic tree is directly predicted and output in a pre-training process, but this approach requires a huge quantity of computing resources.

SUMMARY

The present disclosure provides a method and apparatus for acquiring a pre-trained model, an electronic device and a storage medium.

A method for acquiring a pre-trained model, including adding, in a process of training a pre-trained model using training sentences, a learning objective corresponding to syntactic information for a self-attention module in the pre-trained model; and training the pre-trained model according to the learning objective.

An electronic device, including: at least one processor; and a memory communicatively connected with the at least one processor; wherein the memory stores instructions executable by the at least one processor, and the instructions are executed by the at least one processor to enable the at least one processor to perform a method for acquiring a pre-trained model, wherein the method includes adding, in a process of training a pre-trained model using training sentences, a learning objective corresponding to syntactic information for a self-attention module in the pre-trained model; and training the pre-trained model according to the learning objective.

There is provided a non-transitory computer readable storage medium with computer instructions stored thereon, wherein the computer instructions are used for causing a computer to perform a method for acquiring a pre-trained model, wherein the method includes adding, in a process of training a pre-trained model using training sentences, a learning objective corresponding to syntactic information for a self-attention module in the pre-trained model; and training the pre-trained model according to the learning objective.

An embodiment in the above-mentioned disclosure has the following advantages or beneficial effects: the syntactic information may be used for guiding the training operation of the pre-trained model, such that the pre-trained model learns the syntactic information, thus improving a performance of the pre-trained model, and reducing consumption of computing resources, or the like.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
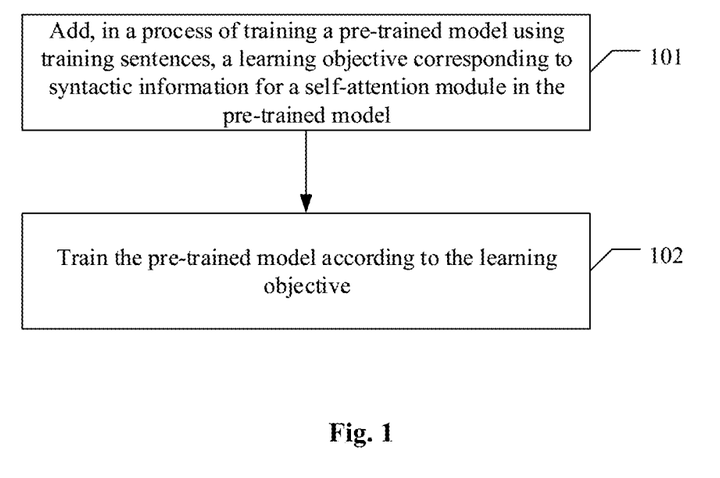
FIG. 1 is a flow chart of a method for acquiring a pre-trained model according to an embodiment of the present disclosure.

FIG. 1 is a flow chart of a method for acquiring a pre-trained model according to an embodiment of the present disclosure. As shown in FIG. 1, the method includes the following implementation steps:

step 101: adding, in a process of training a pre-trained model using training sentences, a learning objective corresponding to syntactic information for a self-attention module (self-attention mechanism) in the pre-trained model; and step 102: training the pre-trained model according to the learning objective.

It is observed that, in the solution of the above-mentioned method embodiment, the syntactic information may be used for guiding the training operation of the pre-trained model, such that the pre-trained model learns the syntactic information, thus improving a performance of the pre-trained model, and reducing consumption of computing resources, or the like.

Usually, the pre-trained model is a pre-trained model based on a transformer architecture, and the self-attention module is a quite important module in the pre-trained model.

In the method according to the present disclosure, an additional subtask learning operation is introduced to regularize a learning operation of the self-attention module, and reference is made to the syntactic information in the regularized design, such that the pre-trained model may learn the syntactic information.

That is, in the process of training the pre-trained model using the training sentences, the learning objective corresponding to the syntactic information may be defined for the self-attention module in the pre-trained model.

The learning objective may include one or both of a first learning objective and a second learning objective. That is, only the first learning objective may be defined, or only the second learning objective may be defined, or the first learning objective and the second learning objective may be defined simultaneously, which is determined according to actual needs, thus achieving a quite flexible and convenient effect.

The first learning objective and the second learning objective are specifically described below respectively.

1) First Learning Objective

For any term x in the training sentence, a first weight corresponding to the term x is required to be greater than a second weight. The first weight is an attention weight between the term x and any term y which is associated with the term x through a direct path in a dependency tree corresponding to the training sentence, and the second weight is an attention weight between the term x and any term z which is associated with the term x through a weak path or is not associated therewith through a path in the dependency tree.

The association through the direct path may mean that the term is located on a same path as and downstream of the term x, and directly connected therewith by one edge, or the term is located on the same path as the term x and directly connected therewith by one edge.

The association through the weak path may mean that the term is located on the same path as and downstream of the term x, and indirectly connected therewith by at least two edges, or the term is located on the same path as the term x and indirectly connected therewith by at least two edges.

The no-path association means that the term is not located on the same path as the term x.

For ease of expression/distinction, the above-mentioned different terms are referred to as the term x, the term y, and the term z respectively.

The syntactic information gives information of a syntactic structure among terms, and the terms with a shorter syntactic path have a higher dependency degree; that is, parents are more likely to be represented by immediate children. Based on this, it may be assumed that, for any given term x, the attention weight between the term x and any term y which is associated with the term x through the direct path in the dependency tree is greater than the attention weight between the term x and any term z which is associated with the term x through the weak path or is not associated therewith through a path in the dependency tree.

Figure 2:
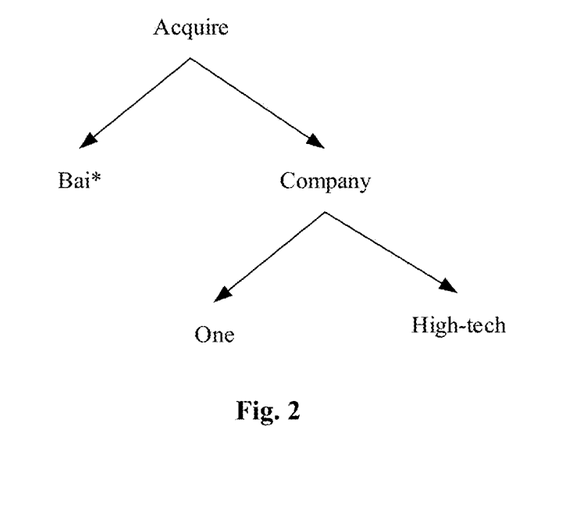
FIG. 2 is a schematic diagram of a dependency tree according to the present disclosure.

Any training sentence may include a plurality of terms; for example, the training sentence "Bai* (representing a company name) acquires a high-tech company" may include terms "Bai*", "acquire", "one", "high-tech", and "company". In addition, a dependency tree corresponding to the training sentence may be constructed using an existing method, as shown in FIG. 2, and FIG. 2 is a schematic diagram of the dependency tree according to the present disclosure. The dependency tree may reflect dependencies between the terms in the training sentence.

For example, the term x is "company" shown in FIG. 2, the term y may be "one" or "high-tech", and it is observed that "one" or "high-tech" is located on the same path as and downstream of "company" (i.e., a child node of "company"), and directly connected with "company" by one edge; the term z may be "Bai*", and it is observed that "Bai*" is not located on the same path as "company".

A direction of the edge is considered in the above processing method, and if the direction of the edge is not considered, for example, the term x is still "company" shown in FIG. 2, and the term y may be "one", "high-tech", or "acquire", that is, is located on the same path as "company" and directly connected therewith by one edge.

Assuming that a child node is further included under "one" shown in FIG. 2, the term corresponding to the node may also be taken as the term z which is a term associated with "company" through a weak path.

As described above, for the term x, the first weight and the second weight may be obtained, the first weight may be the attention weight between the term y and the term x, and the second weight may be the attention weight between the term z and the term x.

In practical applications, the self-attention mechanism may include plural layers, and may be a multi-head self-attention mechanism, and for each term in the same training sentence, under each head of each layer, each term has an attention weight for each of other terms (which may include itself), and a method of obtaining the attention weight is a prior art.

Assuming that a current layer is layer j, $1 \leq j \leq L$, L represents a number of the layers, and a number of heads is 8, taking the term x and the term y as examples, 8 attention weights exist between the term y and the term x, and correspond to 8 heads respectively, and correspondingly, an average of the 8 attention weights may be calculated, and the obtained average is taken as the required first weight. In a same manner, the required second weight may be obtained.

Figure 3:
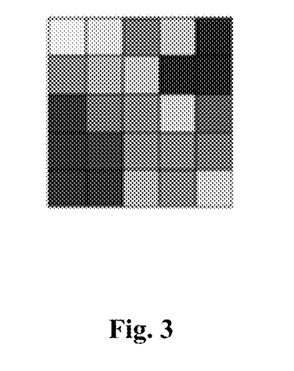
FIG. 3 is a schematic diagram of an attention weight matrix according to the present disclosure.

Using the above-mentioned attention weights, an attention weight matrix may be further obtained, as shown in FIG. 3, and FIG. 3 is a schematic diagram of the attention weight matrix according to the present disclosure, in which a number of squares is equal to the number of the terms included in the training sentence, each square represents the attention weight between two terms, and colors of the squares represent sizes of different attention weights.

For the term x, the first weight is required to be greater (generally, much greater ($\gg$)) than the second weight, and a specific value may be determined according to actual needs.

2) Second Learning Objective

For any subtree in the dependency tree corresponding to the training sentence, a first similarity corresponding to any core term in the subtree is required to be greater than a second similarity, and a third similarity corresponding to the subtree is required to be greater than a fourth similarity. The core term is a term corresponding to a non-leaf node in the subtree.

The first similarity may be a similarity between attention distributions of the core term and any term in the subtree, the second similarity may be a similarity between attention distributions of the core term and any term outside the subtree, the third similarity may be a similarity between attention distributions of terms corresponding to leaf nodes located at left and right boundaries in the subtree, and the fourth similarity may be a similarity between attention distributions of any term in the subtree and any term outside the subtree.

The syntactic information gives chunk information; that is, one subtree may be considered as one chunk which expresses complete and independent semantics. Based on this, it may be assumed that the attention distributions between the terms in a same chunk are relatively consistent, and correspondingly, the similarity between the attention distributions of the terms in the same chunk is higher than the similarity between the attention distributions of the terms in different chunks.

A method of obtaining the similarity between the attention distributions of two terms is not limited. For example, the following calculation may be used:

$$JSD(P, Q) = \frac{1}{2}D_{KL}(P\|M) + \frac{1}{2}D_{KL}(Q\|M); \quad (1)$$

$$M = \frac{1}{2}(P + Q); \quad (2)$$

$$D_{KL}(A\|B) = \sum_{x \in s} A(x)\log\left(\frac{A(x)}{B(x)}\right) \quad (3)$$

wherein P and Q represent the attention distributions of two terms respectively, and JSD(P,Q) represents the similarity between the attention distributions of the two terms.

For any term, the attention distribution thereof may be in a form of a vector, a dimension of the vector is equal to the number of the terms included in the training sentence in which the term is located, and each value in the vector represents the attention weight between the term and each of other terms. Correspondingly, s represents the dimensions of the vector, and x represents each of the dimensions.

In practical applications, the self-attention mechanism may include plural layers, and may be a multi-head self-attention mechanism; for each term in the same training sentence, there exists a corresponding attention distribution under each head of each layer; assuming that the current layer is layer j, $1 \leq j \leq L$, L represents the number of the layers, and the number of the heads is 8, for any term, 8 corresponding attention distributions may be obtained and correspond to 8 heads respectively, and correspondingly, an average of the 8 attention distributions may be calculated, and the obtained average is taken as the required attention distribution of the term.

The similarity between the attention distributions of any core term in any subtree and any term in the subtree is required to be greater (usually, much greater) than the similarity between the attention distributions of the core term and any term outside the subtree, and the similarity between the attention distributions of the terms corresponding to the leaf nodes located at the left and right boundaries in the subtree is required to be greater (usually, much greater) than the similarity between the attention distributions of any term in the subtree and any term outside the subtree.

Taking FIG. 2 as an example, "company" may be the core term; taking the subtree where "company" is located as an example, the similarity between the attention distributions of "company" and "one" is required to be greater than the similarity between the attention distributions of "company" and "Bai*" (the term outside the subtree), and the similarity between the attention distributions of "one" and "high-tech" (the terms corresponding to the leaf nodes located at the left and right boundaries in the subtree) is required to be greater than the similarity between the attention distributions of, for example, "one" and "Bai*".

The pre-trained model may be trained according to the above-mentioned defined learning objective. Preferably, the pre-trained model may be trained according to the defined learning objective and an original learning objective of the pre-trained model, such as a masked language model loss.

That is, the adoption of the method according to the present disclosure may not influence the original training operation of the pre-trained model, and only one or more learning objectives are added on this basis, so as to improve the performance of the pre-trained model, or the like.

Based on the first learning objective, expression calculation of the terms may be more dependent on child nodes (or called descendant nodes) thereof, and based on the second learning objective, the semantics of the information in the chunk may be more consistent; the learning operation may improve the performance of the pre-trained model, thus bringing a further effect improvement to a downstream task.

As mentioned above, in practical applications, the self-attention mechanism may include plural layers, each layer may be processed separately according to the method according to the present disclosure, or a specified layer thereof may be processed according to the method according to the present disclosure, and a specific implementation is not limited.

In addition, it should be noted that for simplicity of description, the above-mentioned embodiment of the method is described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are preferred embodiments and that acts and modules referred to are not necessary for the present disclosure.

The above is a description of an embodiment of the method, and an embodiment of an apparatus according to the present disclosure will be further described below.

Figure 4:
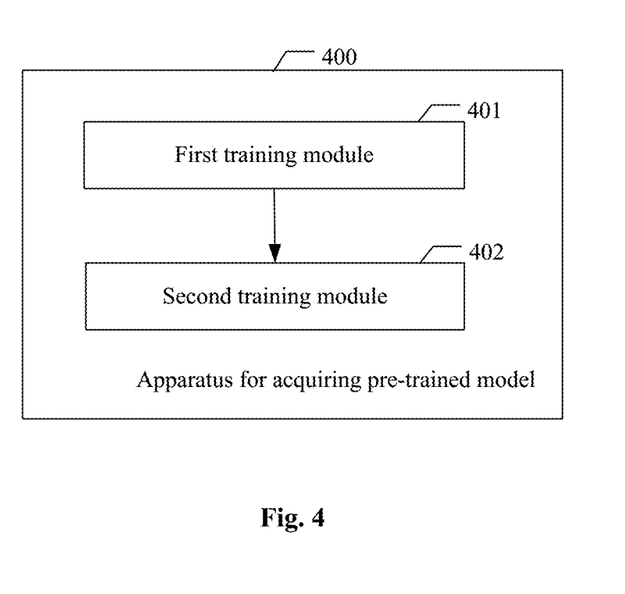
FIG. 4 is a schematic structural diagram of an apparatus 400 for acquiring a pre-trained model according to an embodiment of the present disclosure.

FIG. 4 is a schematic structural diagram of an apparatus 400 for acquiring a pre-trained model according to an embodiment of the present disclosure. As shown in FIG. 4, the apparatus includes a first training module 401 configured to add, in a process of training a pre-trained model using training sentences, a learning objective corresponding to syntactic information for a self-attention module in the pre-trained model; and a second training module 402 configured to train the pre-trained model according to the learning objective.

Usually, the pre-trained model is a pre-trained model based on a transformer architecture, and the self-attention module is a quite important module in the pre-trained model.

In the process of training the pre-trained model using the training sentences, the learning objective corresponding to the syntactic information may be defined for the self-attention module in the pre-trained model. The learning objective may include one or both of a first learning objective and a second learning objective. That is, only the first learning objective may be defined, or only the second learning objective may be defined, or the first learning objective and the second learning objective may be defined simultaneously.

The first learning objective may indicate that for any term x in the training sentence, a first weight corresponding to the term x is required to be greater than a second weight, the first weight is an attention weight between the term x and any term y which is associated with the term x through a direct path in a dependency tree corresponding to the training sentence, and the second weight is an attention weight between the term x and any term z which is associated with the term x through a weak path or is not associated therewith through a path in the dependency tree.

The association through the direct path may mean that the term is located on a same path as and downstream of the term x, and directly connected therewith by one edge, or the term is located on the same path as the term x and directly connected therewith by one edge.

The association through the weak path may mean that the term is located on the same path as and downstream of the term x, and indirectly connected therewith by at least two edges, or the term is located on the same path as the term x and indirectly connected therewith by at least two edges.

The no-path association means that the term is not located on the same path as the term x.

The second learning objective may indicate that for any subtree in the dependency tree corresponding to the training sentence, a first similarity corresponding to any core term in the subtree is required to be greater than a second similarity, and a third similarity corresponding to the subtree is required to be greater than a fourth similarity. The core term is a term corresponding to a non-leaf node in the subtree.

The first similarity may be a similarity between attention distributions of the core term and any term in the subtree, the second similarity may be a similarity between attention distributions of the core term and any term outside the subtree, the third similarity may be a similarity between attention distributions of terms corresponding to leaf nodes located at left and right boundaries in the subtree, and the fourth similarity may be a similarity between attention distributions of any term in the subtree and any term outside the subtree.

The pre-trained model may be trained according to the above-mentioned learning objective. Preferably, the second training module 402 may train the pre-trained model according to the above-mentioned learning objective and an original learning objective of the pre-trained model.

For the specific work flow of the embodiment of the apparatus shown in FIG. 4, reference is made to the related description in the foregoing embodiment of the method, and details are not repeated.

In conclusion, with the solution of the apparatus according to the embodiment of the present disclosure, the syntactic information may be used for guiding the training operation of the pre-trained model, such that the pre-trained model learns the syntactic information, thus improving a performance of the pre-trained model, and reducing consumption of computing resources, or the like.

The solution of the present disclosure may be applied to the field of artificial intelligence, and particularly relates to the fields of natural language processing technologies, deep learning technologies, or the like.

Artificial intelligence is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the artificial intelligence include technologies, such as a sensor, a dedicated artificial intelligence chip, cloud computing, distributed storage, big data processing, or the like; the software technologies of the artificial intelligence mainly include a computer vision technology, a voice recognition technology, a natural language processing technology, a machine learning/deep learning technology, a big data processing technology, a knowledge graph technology, or the like.

According to the embodiment of the present disclosure, there are also provided an electronic device, a readable storage medium and a computer program product.

Figure 5:
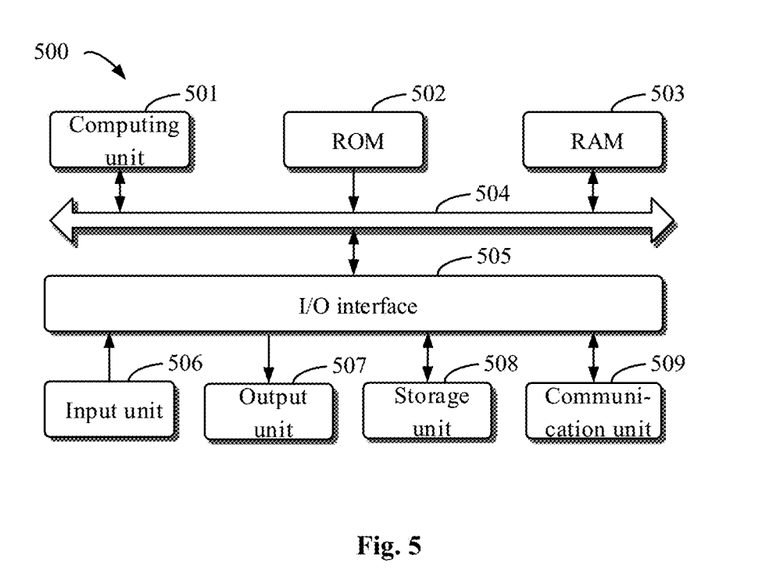
FIG. 5 shows a schematic block diagram of an exemplary electronic device 500 which may be configured to implement the embodiments of the present disclosure.

FIG. 5 shows a schematic block diagram of an exemplary electronic device 500 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 5, the device 500 includes a computing unit 501 which may perform various appropriate actions and processing operations according to a computer program stored in a read only memory (ROM) 502 or a computer program loaded from a storage unit 508 into a random access memory (RAM) 503. Various programs and data necessary for the operation of the device 500 may be also stored in the RAM 503. The computing unit 501, the ROM 502, and the RAM 503 are connected with one other through a bus 504. An input/output (I/O) interface 505 is also connected to the bus 504.

The plural components in the device 500 are connected to the I/O interface 505, and include: an input unit 506, such as a keyboard, a mouse, or the like; an output unit 507, such as various types of displays, speakers, or the like; the storage unit 508, such as a magnetic disk, an optical disk, or the like; and a communication unit 509, such as a network card, a modem, a wireless communication transceiver, or the like. The communication unit 509 allows the device 500 to exchange information/data with other devices through a computer network, such as the Internet, and/or various telecommunication networks.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 501 performs the methods and processing operations described above, such as the method according to the present disclosure. For example, in some embodiments, the method according to the present disclosure may be implemented as a computer software program tangibly contained in a machine readable medium, such as the storage unit 508. In some embodiments, part or all of the computer program may be loaded and/or installed into the device 500 via the ROM 502 and/or the communication unit 509. When the computer program is loaded into the RAM 503 and executed by the computing unit 501, one or more steps of the method according to the present disclosure may be performed. Alternatively, in other embodiments, the computing unit 501 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain. The cloud computing technology is a technical system in which an elastically extensible shared physical or virtual resource pool is accessed through a network, resources may include servers, operating systems, networks, software, applications, storage devices, or the like, and the resources may be deployed and managed in a self-service mode according to needs; the cloud computing technology may provide an efficient and powerful data processing capacity for technical applications and model training of artificial intelligence, blockchains, or the like.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for acquiring a pre-trained model, comprising:
   adding, in a process of training a pre-trained model using training sentences, a learning objective corresponding to syntactic information for a self-attention module in the pre-trained model; and
   training the pre-trained model according to the learning objective,
   wherein the learning objective may comprise one or both of a first learning objective and a second learning objective, wherein the first learning objective indicates that:
for any term x in the training sentence, a first weight corresponding to the term x is required to be greater than a second weight; the first weight is an attention weight between the term x and any term y which is associated with the term x through a direct path in a dependency tree corresponding to the training sentence, and the second weight is an attention weight between the term x and any term z which is associated with the term x through a weak path or is not associated therewith through a path in the dependency tree.

2. The method according to claim 1, wherein
the association through the direct path means that the term is located on a same path as and downstream of the term x, and directly connected therewith by one edge, or the term is located on the same path as the term x and directly connected therewith by one edge;
the association through the weak path means that the term is located on the same path as and downstream of the term x, and indirectly connected therewith by at least two edges, or the term is located on the same path as the term x and indirectly connected therewith by at least two edges; and
the no-path association means that the term is not located on the same path as the term x.

3. The method according to claim 1, wherein the second learning objective indicates that:
for any subtree in the dependency tree corresponding to the training sentence, a first similarity corresponding to any core term in the subtree is required to be greater than a second similarity, and a third similarity corresponding to the subtree is required to be greater than a fourth similarity; the core term is a term corresponding to a non-leaf node in the subtree;
the first similarity is a similarity between attention distributions of the core term and any term in the subtree, the second similarity is a similarity between attention distributions of the core term and any term outside the subtree, the third similarity is a similarity between attention distributions of terms corresponding to leaf nodes located at left and right boundaries in the subtree, and the fourth similarity is a similarity between attention distributions of any term in the subtree and any term outside the subtree.

4. The method according to claim 1, further comprising:
training the pre-trained model according to the learning objective and an original learning objective of the pre-trained model.

5. The method according to claim 1, further comprising:
training the pre-trained model according to the learning objective and an original learning objective of the pre-trained model.

6. The method according to claim 1, further comprising:
training the pre-trained model according to the learning objective and an original learning objective of the pre-trained model.

7. The method according to claim 2, further comprising:
training the pre-trained model according to the learning objective and an original learning objective of the pre-trained model.

8. The method according to claim 3, further comprising:
training the pre-trained model according to the learning objective and an original learning objective of the pre-trained model.

9. An electronic device, comprising:
at least one processor; and
a memory communicatively connected with the at least one processor;
wherein the memory stores instructions executable by the at least one processor, and the instructions are executed by the at least one processor to enable the at least one processor to perform a method for acquiring a pre-trained model, wherein the method comprises:
adding, in a process of training a pre-trained model using training sentences, a learning objective corresponding to syntactic information for a self-attention module in the pre-trained model; and
training the pre-trained model according to the learning objective,
wherein the learning objective may comprise one or both of a first learning objective and a second learning objective,
wherein the first learning objective indicates that:
for any term x in the training sentence, a first weight corresponding to the term x is required to be greater than a second weight; the first weight is an attention weight between the term x and any term y which is associated with the term x through a direct path in a dependency tree corresponding to the training sentence, and the second weight is an attention weight between the term x and any term z which is associated with the term x through a weak path or is not associated therewith through a path in the dependency tree.

10. The electronic device according to claim 9, wherein
the association through the direct path means that the term is located on a same path as and downstream of the term x, and directly connected therewith by one edge, or the term is located on the same path as the term x and directly connected therewith by one edge;
the association through the weak path means that the term is located on the same path as and downstream of the term x, and indirectly connected therewith by at least two edges, or the term is located on the same path as the term x and indirectly connected therewith by at least two edges; and
the no-path association means that the term is not located on the same path as the term x.

11. The electronic device according to claim 9, wherein the second learning objective indicates that:
for any subtree in the dependency tree corresponding to the training sentence, a first similarity corresponding to any core term in the subtree is required to be greater than a second similarity, and a third similarity corresponding to the subtree is required to be greater than a fourth similarity; the core term is a term corresponding to a non-leaf node in the subtree;
the first similarity is a similarity between attention distributions of the core term and any term in the subtree, the second similarity is a similarity between attention distributions of the core term and any term outside the subtree, the third similarity is a similarity between attention distributions of terms corresponding to leaf nodes located at left and right boundaries in the subtree, and the fourth similarity is a similarity between attention distributions of any term in the subtree and any term outside the subtree.

12. The electronic device according to claim 9, further comprising:
training the pre-trained model according to the learning objective and an original learning objective of the pre-trained model.

13. The electronic device according to claim 9, further comprising:
    training the pre-trained model according to the learning objective and an original learning objective of the pre-trained model.

14. The electronic device according to claim 9, further comprising:
    training the pre-trained model according to the learning objective and an original learning objective of the pre-trained model.

15. The electronic device according to claim 10, further comprising:
    training the pre-trained model according to the learning objective and an original learning objective of the pre-trained model.

16. A non-transitory computer readable storage medium with computer instructions stored thereon, wherein the computer instructions are used for causing a computer to perform a method for acquiring a pre-trained model, wherein the method comprises:

adding, in a process of training a pre-trained model using training sentences, a learning objective corresponding to syntactic information for a self-attention module in the pre-trained model; and training the pre-trained model according to the learning objective, wherein the learning objective may comprise one or both of a first learning objective and a second learning objective, wherein the first learning objective indicates that:

for any term x in the training sentence, a first weight corresponding to the term x is required to be greater than a second weight; the first weight is an attention weight between the term x and any term y which is associated with the term x through a direct path in a dependency tree corresponding to the training sentence, and the second weight is an attention weight between the term x and any term z which is associated with the term x through a weak path or is not associated therewith through a path in the dependency tree.

\* \* \* \* \*